United States Patent [19]
Galen et al.

[11] 3,964,611
[45] June 22, 1976

[54] BICYCLE RACK

[76] Inventors: Ralph W. Galen, 131 Mount Auburn, Cambridge, Mass. 02138; John A. Vanderpoel, Crescent Road, Concord, Mass. 01742

[22] Filed: Feb. 10, 1975

[21] Appl. No.: 548,533

Related U.S. Application Data

[63] Continuation-in-part of Ser. No. 406,016, Oct. 12, 1973, Pat. No. 3,865,244.

[52] U.S. Cl. .................................. 211/5; 70/235; 211/8; 211/22
[51] Int. Cl.² ................... A47F 7/04; B62H 3/08
[58] Field of Search ............... 211/5, 8, 9, 17, 18, 211/19, 20, 21, 22; 70/54, 55, 56, 203; 292/215, 217, 222

[56] References Cited
UNITED STATES PATENTS

| | | | |
|---|---|---|---|
| 607,795 | 7/1898 | Gallaway | 280/297 X |
| 736,731 | 8/1903 | Hufeland | 211/8 |
| 1,051,930 | 2/1913 | Vaughn | 211/9 |
| 1,118,497 | 11/1914 | Klimczyk | 211/8 |
| 1,905,815 | 4/1933 | Orlow | 292/217 X |
| 2,856,220 | 10/1958 | Easley | 70/56 X |
| 3,572,796 | 3/1971 | Willner | 292/281 |
| 3,739,609 | 6/1973 | Kaufmann | 211/5 X |
| 3,762,569 | 10/1973 | Spring | 70/235 X |
| 3,783,659 | 1/1974 | Rossi | 70/234 |
| 3,800,570 | 4/1974 | Kaplan | 70/54 X |
| 3,865,244 | 2/1975 | Galen et al. | 211/5 |
| R3,572,062 | 3/1971 | Beebe | 292/281 X |

FOREIGN PATENTS OR APPLICATIONS

| | | | |
|---|---|---|---|
| 71,935 | 4/1943 | Czechoslovakia | 211/22 |
| 1,628 | 7/1897 | Denmark | 211/20 |
| 17,868 | 10/1898 | United Kingdom | 211/20 |

*Primary Examiner*—James T. McCall
*Assistant Examiner*—Thomas J. Holko
*Attorney, Agent, or Firm*—Schiller & Pandiscio

[57] ABSTRACT

A device is provided for supporting and locking a bicycle. It comprises a channel member for receiving the front and rear wheels of the bicycle, a supporting section which includes a support member fixed with respect to the channel member, a pivotally mounted clamping mechanism for clamping a portion of the frame of the bicycle to the support member against movement relative to the support member and a wheel locking assembly cooperating with the clamping mechanism clamping the front and rear wheels in the channel member.

11 Claims, 5 Drawing Figures

BICYCLE RACK

RELATED APPLICATION

This application is a continuation-in-part of parent application Ser. No. 406016 filed Oct. 12, 1973, now U.S. Pat. No. 3,865,244.

This invention relates to a device for supporting and locking a bicycle, and in particular to a device for securing and locking a bicycle of substantially any conventional size or design.

In recent years, there has been a resurgent popularity in bicycles which is more than likely attributable to an increased awareness in physical fitness as well as the environmental crises resulting from the use of the automobile. With this resurgent popularity, however, more and more bicycles are being tampered with as well as stolen.

As a result, many devices have been proposed for securing and locking bicycles. Some of these devices are designed to secure the frame and usually the rear wheel of the bicycle together. For example, bicycle locks which have a long shackle to accommodate both the frame and wheel are very popular. Another example which is used quite extensively is the lock and chain. The chain is usually long enough to be wrapped around the frame and wheel as well as some immovable object such as a tree trunk, lamp post, supports for traffic signs, etc. The lock is then used to secure the two ends of the chain together, thereby securing the bicycle to the immovable object. These devices, however, have proven inadequate since most commercially available locks including bicycle locks can be easily broken with various tools. Further, when a lock and chain are used, the chain can easily be cut with bolt cutters, making it easy for thieves to take the bicycles. Additionally, instances have occurred where the bicycles are physically carried away when the bicycle lock is used. Other instances have occurred where the bicycle was secured to an immovable object, and the thief lifted the bicycle and chain over the object to which it is secured to slip the chain off and carry the bicycle away. It has also been found that although these devices may deter thieves from stealing the bicycles, the bicycles can still be easily tampered with, e.g., the front wheel may be removed.

Although various bicycle security stands have been proposed, many are inadequate since they only can be used to secure one wheel and frame and thereby suffer from the same diadvantages as the bicycle lock and lock and chain. Further, many are unsuitable as well as easily movable and some will not accommodate bicycles of different sizes and design. Furthermore, the locks are left unprotected and consequently can be easily broken and the bicycle taken.

Accordingly, an object of the present invention is to provide an improved device which overcomes the aforementioned problems.

Another object of the present invention is to provide a novel device for supporting and holding a bicycle which will aid in preventing theft.

Still another object of the present invention is to provide a device for securing and locking the frame and both wheels of any normal size or design bicycle.

Yet another object of the present invention is to provide an improved bicycle security stand which is stable as well as immovable and which has means for shielding the lock so that the latter cannot be easily broken.

The foregoing and other objects are accomplished by a device for supporting and holding a bicycle which includes a base section having channel means for receiving the front and rear wheels of the bicycle, a support member that is fixed with respect to the base section, a pivotally mounted clamping mechanism for clamping a portion of the frame of the bicycle to the support member against movement relative to the support member and a wheel locking assembly cooperating with the clamping mechanism for clamping the front and rear wheels in the channel means.

Other features and many of the attendant advantages of the invention are described or rendered obvious by the following detailed description which is to be considered together with the accompanying drawings.

FIG. 5 is a side view in elevation of the embodiment of FIG. 1 showing how it is used to secure a bicycle.

Figure 1:
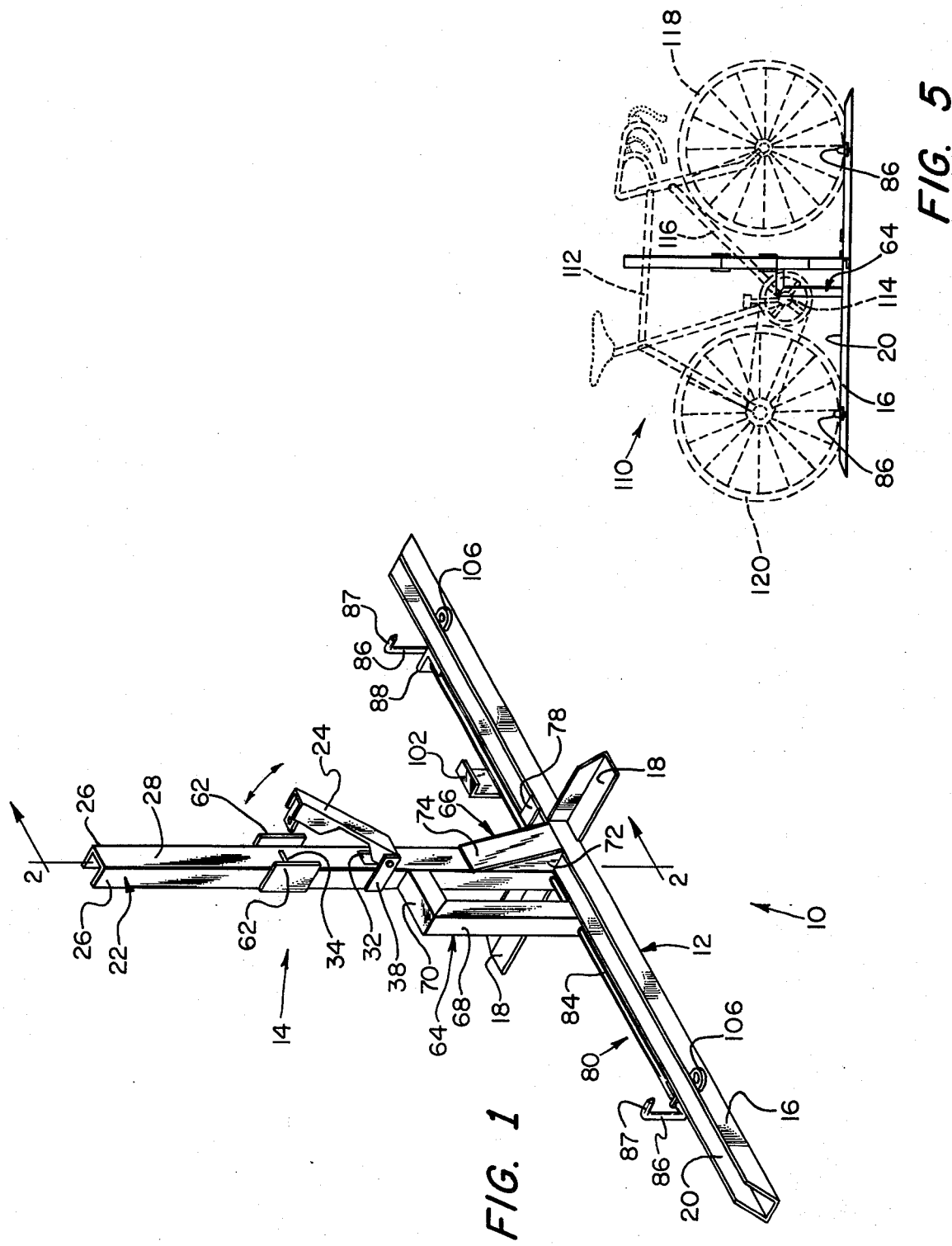
FIG. 1 is a perspective view of one embodiment of the bicycle support embodying the features of the present invention.

Referring to the drawings, wherein like numerals refer to like parts, the illustrated bicycle security stand 10 shown in FIG. 1 comprises a horizontal base section 12 and a vertical bicycle-supporting section 14. Base section 12 comprises an elongate channel member 16 and intermediate bracing members 18. These members are made of steel or other suitable metals and are secured to one another by welding or brazing.

The channel member 16 is straight and has a U-shaped cross-section forming a channel 20. Channel 20 is dimensioned so that its width is slightly larger than the width of a standard size bicycle wheel in order that the former will snuggly accommodate the latter. Channel 20 is made sufficiently long to receive the largest of the conventionally-sized bicycles.

Bracing members 18 are connected substantially at the center of channel member 16, approximately where the bicycle-supporting section is connected to the channel member 16 in order to provide stability to the stand. Preferably, in order to provide maximum stability, bracing members 18 are connected on each side of member 16 so that they are substantially perpendicular to member 16. It will be appreciated that although members 18 are shown with a L-shaped cross-sectional shape, other cross-sectional shapes can be utilized, such as members having a U-shaped cross-section. As described in the parent application, Ser. No. 406,016, now U.S. Pat. No. 3,865,244, additional stability may be provided, by connecting end members (not shown) to both ends of member 16.

The entire base section 12 is designed to be partially embedded in or anchored to a concrete foundation or footing embedded in the ground so that the channel 20 remains exposed. The base section may be anchored by means of bolts passing through holes in channel member 16 and bracing member 18 and anchored in the concrete footing or foundation.

Figure 2:
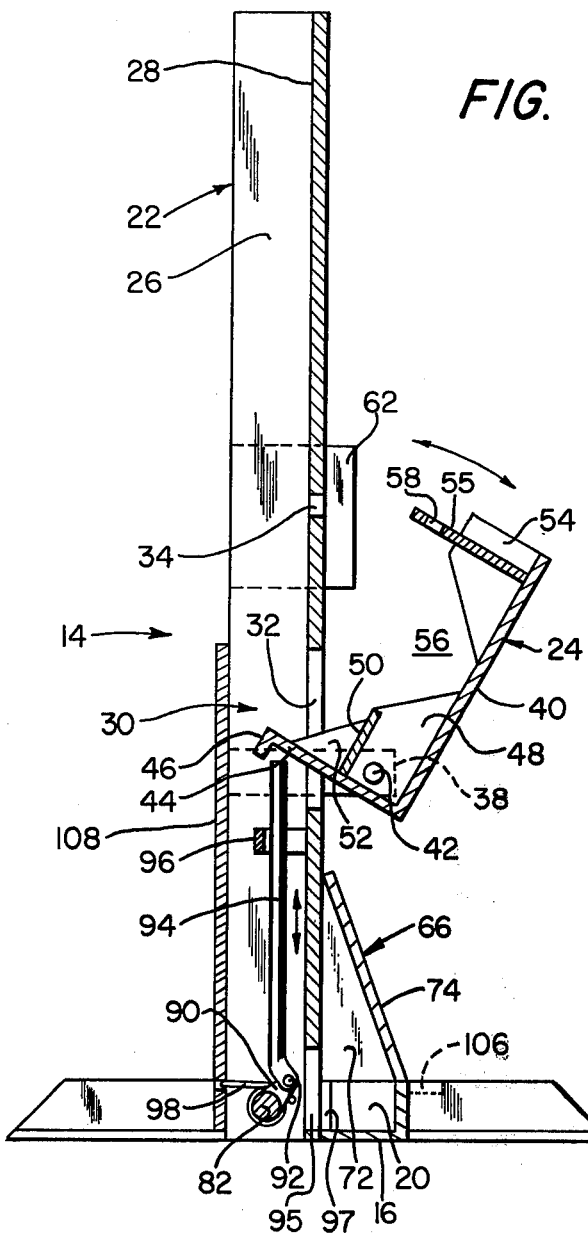
FIG. 2 is a cross-sectional view taken substantially along line 2—2 of FIG. 1.

The support section 14, as shown in FIG. 1 and in greater detail in FIG. 2, comprises a vertical support member 22 and a clamping mechanism 24. The support member 22 is secured to one side of the member 16 and preferably also to one of the bracing members 18. The member 22 is made of channel iron and thus has opposite side wall sections 26 and a base or connecting section 28 defining a channel 30. The open side of support member 22 faces away from a channel member 16. A relatively large guide aperture or slot 32 and a narrow lock aperture or slot 34 are provided in the base section 28 of support member 22. The aperture 32 is sized to accommodate the cam plate 44 of clamping mechanism 24, which is described in greater detail hereinafter. The lock aperture 34 is preferably disposed above aperture 32, and is intended to receive the tongue 55 of clamping mechanism 24 also described hereinafter.

The clamping mechanism 24 comprises a pair of bracket arms 38, a hasp in the form of a lever arm 40, and a pivot pin 42. Bracket arms 38 are essentially two flat plates which are affixed by welding to the outer sides of side wall sections 26 of member 22. Bracket arms 38 are made long enough to extend out over channel 20 and have aligned holes to accommodate a pivot pin 42.

The bottom end of lever arm 40 has a right-angled extension forming a cam plate 44 which extends between bracket arms 38 and is movable into and out of guide aperture 32. The end of plate 44 is provided with a downwardly extending lip 46. This same end of lever arm 40 has a pair of ears 48 at its opposite sides which fit between bracket arms 38 and have aligned holes to accommodate pivot pin 42. Lever arm 40 and cam plate 44 are reinforced by a cross-bar 50 which is welded to cam plate 44 and extends between and is welded to ears 48. Cross-bar 50 also serves to cover a substantial portion of aperture 32 when the clamping mechanism 24 is pivoted to a locked position, as described in greater detail hereinafter, and thereby helps to prevent anyone from tampering with pivot pin 42 through slot 32. In order to further reinforce cross-bar 50, a reinforcing rib 52 is secured to cam plate 44 and plate 50. Rib 52 preferably is located about halfway between the side edges of cam plate 44.

Figure 3:
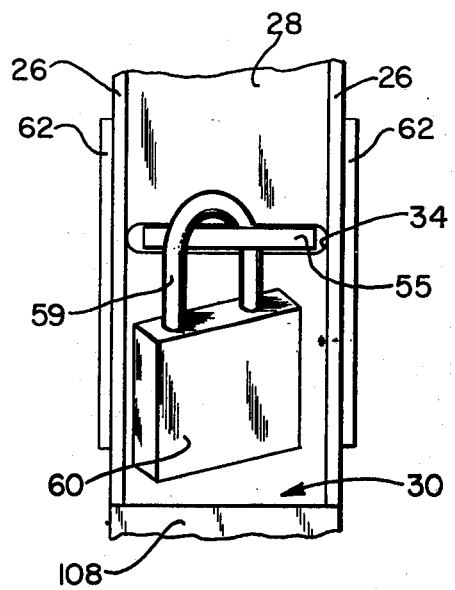
FIG. 3 is an enlarged partial rear view of the device in the locked position.

The other end of lever arm 40 has a right angled extension forming a tongue 55, and a pair of ears 54 which reinforce tongue 55. Tongue 55 is preferably spaced below the upper end edge of lever arm 40 in order to make it more difficult to tamper with the tongue. Ears 48 and 54 are welded to or form integral parts of lever arm 40 and are shaped so that lever arm 40 has side vents 56 for receiving a portion of the lower forward reach of a bicycle frame when the bicycle is mounted in the stand and the lever arm is rotated to a bicycle clamping position as described hereinafter. The tongue 55 is sized so that it will extend through the aperture 34 into channel 30 when lever arm 40 is pivoted to the bicycle clamping position. The free end of tongue 55 is provided with an opening 58 which is disposed in channel 30 when the clamping mechanism is pivoted to the clamping position. As shown in FIG. 3, the purpose of opening 58 is to receive the shackle 59 of a padlock 60, whereby the tongue is locked against withdrawal from the aperture 34. In this way the mechanism 24 is locked in the clamped position. A padlock is used which is sized to fit in channel 30 of support member 22 as shown in FIG. 3.

In order to make it further difficult to tamper with the mechanism 24 and in particular with the tongue 55 when the mechanism 24 is locked in the clamped position, a pair of guard members 62 are provided. Guard members 62 are essentially two flat plates which are welded to the side sections 26 of member 22 on opposite sides of aperture 34. The length of the guard members 62 is sufficient so that each extends over the space which is provided between the ears 54 and the base section 28 of member 22 at tongue 55, when lever arm 40 is locked in its clamping position.

An L-shaped reinforcing structure 64 and a diagonal reinforcing structure 66 are provided to give additional stability and strength to stand 10 with respect to torsional forces. Structure 64 also serves as a positioning means for the frame hub of the bicycle which is mounted in the stand, while structure 66 also aids in protecting portions of the wheel locking assembly 80, as described in greater detail hereinafter. The reinforcing structure 64 comprises two arms 68 and 70 of L or U-shaped cross-section that are welded to each other and also to channel member 16 and support member 22, respectively. Structure 66 comprises a diagonal plate 74 and a pair of side plates 72. Side plates 72 and diagonal plate 74 are welded together at their sides, and at their lower ends to channel member 16. The upper end of diagonal plate 74 and the sides of plates 74 are also welded to the base section 28 of support member 22. If desired, channel member 16 may be further strengthened by providing an additional reinforcing plate 78 over a portion of channel 20 and welding it to both sides of channel member 16.

Figure 4:
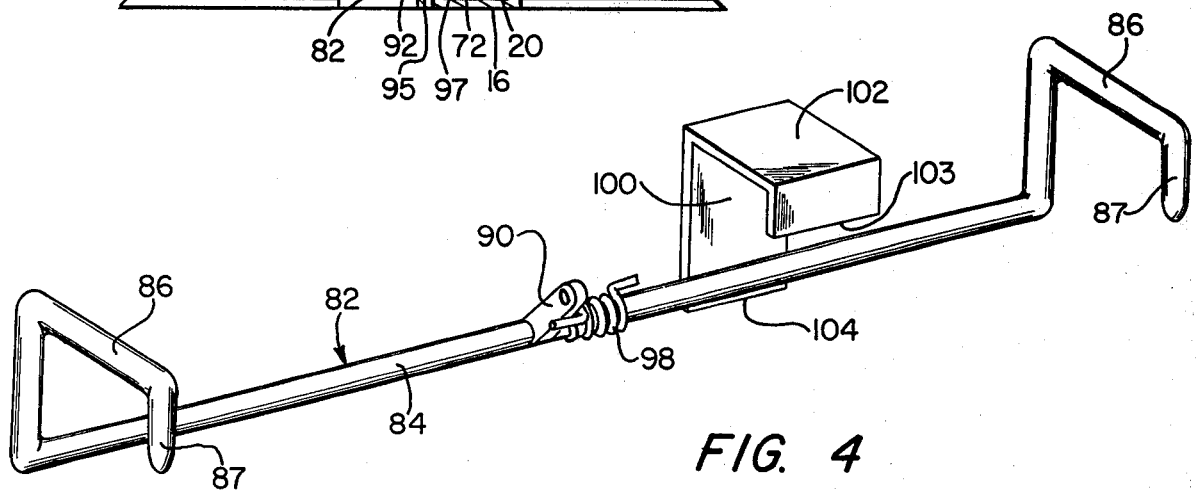
FIG. 4 is an enlarged perspective view of a portion of the wheel locking assembly.

A wheel locking assembly 80 is provided in order to further ensure the safety of the bicycle and in particular to help prevent the front and rear wheels from being taken. Locking assembly 80 is movably mounted with respect to channel 20 and is adapted to engage and lock the front and rear bicycle wheels which are received by channel 20. The wheel locking mechanism 80, which is shown in FIGS. 1 and 2 and in greater detail in FIG. 4, comprises an elongate rod 82 which is substantially straight along its central portion 84 and is bent at its opposite ends so as to form offset arms 86 which extend at a right angle to its axis and have downturned extensions 87. Rod 82 is rotatable on the longitudinal axis of its central portion 84. This is accomplished by mounting the ends of portion 84 in holes provided in two L brackets 88 which are secured to the rear side of channel member 16. The center part of central portion 84 also extends through holes provided in member 64 and the opposite side wall sections 26 of support member 22. The holes in brackets 88 and members 22 and 64 are aligned so that the axis of central portion 84 of rod 82 is substantially parallel to channel member 16. The wheel locking assembly 80 further comprises an arm 90 which is welded to rod 82 so that it extends radially from the central portion 84 between the side wall sections 26 of support member 22. A slide bar 94, positioned in channel 30, is pivotally secured at its lower end to the end of arm 90 by a pivot pin 92. The lower end of slide bar 94 is bent as shown so that the pivot pin 92 is off-set from the longitudinal axis of the slide bar, whereby a downward force on bar 94 will cause rod 82 to rotate clockwise as seen in FIG. 2. In order to insure the free movement of the arm 90 and the lower end of the slide bar 94, slots 95 and 97 are respectively provided in the base section 28 of channel member 22 and the rear side of channel member 16. The bar 94 is prevented from pivoting down out of channel 30 by means of a U-shaped bracket 96 which is attached to the inner surfaces of the side section 26 of channel member 22 and extends behind the slide bar. A spring 98 is employed to urge rod 82 counterclockwise (as seen in FIG. 2) for the purpose of pivoting the arms 86 up and away from channel 20 as well as holding bar 94 in a raised position so that the upper end of bar 94 can be engaged by cam plate 44 when lever arm 40 is moved to the clamping position. The spring 98 is wound around rod 82 with one end hooked around arm 90 and the other end secured to the support member 22. Means are also provided for limiting the extent to which rod 82 can be rotated by spring 98. Such means comprise a plate 100 which is welded to the straight portion 84 of rod 82 and has a right angled arm 102 with a downturned flange 103 at its free end. Arm 102 extends parallel to arms 86 (see FIG. 4) and is long enough to extend over and into channel member 16 when rod 82 is rotated clockwise. The bottom end edge 104 of plate 100 projects beyond rod 82 such that it can engage the rear side of channel member 16 and thereby stop rotation of rod 82 when the latter is urged counterclockwise by spring 98. The bottom end edge 104 is disposed so as to stop rod 82 when arms 86 and 102 are in a vertical or near vertical position.

The length of rod 82 is such that when the bottom bracket shell of a bicycle rests against the side of arm 68 of structure 64, the arms 86 of the rod 82 are located approximately in line with those portions of the rims of the front and rear wheels of the bicycle which are at about the 6 o'clock positions. When lever arm 40 is rotated to a clamping position so that its cam plate 44 engages the top end of bar 94 and cams bar 94 downward against the bias of spring 98, and rod 82 is caused to rotate clockwise (as seen in FIG. 2) so as to pivot arms 86 forwardly and downwardly over the channel 20.

Conversely, when lever arm 40 is pivoted away from member 22 as shown in FIG. 2, the bottom surface of cam plate 44 will move up and away from the top of the bar 94, whereupon spring 98 will cause the bar 94 to move upwardly and to rotate rod 82 counterclockwise far enough to restore arms 86 and 102 to the vertical or near vertical position.

In order to make it more difficult to tamper with arms 86 of rod 82 when the arms are in the locked position, the channel member 16 is additionally provided with brackets 106 that have holes which receive the extensions 87 of arms 86 when the latter are rotated to the locked position.

Finally, in order to protect the vertical bar 94, spring 98 and pivot pin 92, a cover plate 108 is welded to the open side of channel member 22. Plate 108 preferably extends from the bottom end of channel member 22 to a height just below guard members 62, so that there is sufficient space in channel 30 to accommodate the padlock 60.

FIG. 5 shows a bicycle 110 mounted in stand 10. The bicycle comprises a frame 112 which includes a bottom bracket shell 114 and a down tube 116, plus a front wheel 118 and a rear wheel 120. The bicycle is mounted on the stand by placing wheels 118 and 120 in channel 20 and resting shell 114 against the side of arm 68 of the L-shaped reinforcing structure 64. This is accomplished while lever arm 40 is hanging down. Once the bicycle is positioned in channel 20, lever arm 40 is pivoted up so that cam plate 44 will engage the top end of slide bar 94. The cam plate forces the slide bar 94 downward in direction, and thus causes rod 82 to rotate clockwise approximately 90° (as shown in FIG. 2). This causes arms 86 to move between the spaces of the bicycle wheels over the portions of the rims which are located in channel 20 and locate extension 87 in the holes of brackets 106. Once the clamping mechanism is pivoted to the locking position, the down tube 116 will be in the opening 56 and be clamped against movement by support member 22 and lever arm 40. The tongue 55 extends through the aperture 34 into channel 30 and the shackle 59 of padlock 60 is inserted through the hole 58 of tongue 55 so as to lock the mechanism 24 in the clamped position.

In this position it will be very difficult if not impossible to tamper and break the padlock 60 since the latter nests in channel 30 and cannot be easily struck with a hammer due to interference by the side sections 26 of support member 22. Further, neither wheel can be removed from the frame because arms 86 of rod 82 provide protection with respect to removal of the wheels. Finally, in the locked position, even if the pivot pin 42 is removed, the lever arm 40 will be difficult to remove, since the lip 46 will catch on to and be blocked by the top end of the slide bar 94.

In order to remove the bicycle 110, the padlock 60 is removed, clamping mechanism 24 is pivoted so that the tongue 55 is pulled out of engagement with channel 30 and aperture 34 so that the clamping mechanism disengages the lower forward reach of bicycle 110. At the same time spring 98 will cause rod 82 to rotate in a direction to pivot its arms 86 up and away from channel 20 so as to free the front and rear wheels of the bicycle. The rod 82 will rotate until the edge 104 of plate 100 engages the side of channel member 16.

The arm 102 of plate 100 also functions as a treadle to assist in forcing arms 86 to clamp the bicycle wheels to channel member 16. Also the flange 103, by engaging the upper edge of the front side of channel member 16, acts to limit the extent to which rod 82 can be rotated clockwise (as seen in FIG. 2).

The stand 10 can be easily constructed of any structural metal, such as iron or steel, and thus all connecting elements can be welded or bolted together, providing a strong, sturdy and durable device. It is easily adaptable for use as a bicycle stand as well as supporting structures for other devices. For example, a municipality may mount parking meters, or regulatory signs at the top of support member 22.

Since certain obvious changes may be made in the illustrated embodiment of the device, without departing from the scope of the invention, it is intended that all matter contained herein be interpreted as illustrative and not in a limiting sense.

What is claimed is:

1. A device for supporting and holding a bicycle comprising:
   channel means for receiving the front and rear wheels of a bicycle;
   a support member fixed with respect to said channel means and extending at an angle thereto;
   clamp means pivotally mounted to said support member for locking a portion of the frame of said bicycle to said support member and
   wheel locking means cooperative with said clamp means for engaging at least one of said bicycle wheels received by said channel means and locking said wheel to said channel means, said wheel-locking means being movable into and out of wheel locking position responsively to the pivotal movement of said clamp means.

2. A device according to claim 1, wherein said clamp means includes cam means, and said wheel locking means includes at least one arm pivotally mounted to said channel means and slide means operable by said cam means for pivoting said arm into wheel locking position.

3. A device in accordance with claim 2, including spring means for urging said at least one arm out of said wheel locking position.

4. A device in accordance with claim 1 including an aperture in said support member and a tongue on said clamp means sized and disposed so as to pass into and project through said aperture when said clamp means is pivoted into clamping position.

5. A device in accordance with claim 4, wherein said tongue is adapted to be locked to said support member so as to hold said clamp means in said clamping position.

6. A device according to claim 4 wherein said support member includes a channel and said tongue is sized to project into said channel through said aperture, and further wherein the portion of said tongue that projects into said channel has an opening to receive the shackle of a padlock whereby said tongue can be locked against withdrawal from said aperture.

7. A device according to claim 1 wherein said support member is disposed at substantially a right angle to said channel means.

8. A device in accordance with claim 1, wherein said wheel locking means includes means for limiting the movement of said wheel locking means between an open position and a wheel locking position.

9. A device in accordance with claim 1, wherein said wheel locking means comprises a pair of arms spaced from one another lengthwise of said channel means, and means for locking said arms in overlying relation to said channel means.

10. A device for supporting and holding a bicycle comprising:
channel means for receiving the front and rear wheels of a bicycle;
a channel support defining support member fixed with respect to the channel means and extending at an angle thereto;
clamp means for clamping a portion of the frame of said bicycle to the support member, said clamp means comprising a clamp member pivotally mounted to said support member and movable on its pivot between a first clamping position and a second non-clamping position;
wheel locking means attached to said channel means for engaging at least one of said bicycle wheels received by said channel means and releasably locking said at least one wheel to said channel means, said wheel locking means being movable between a first wheel-releasing position and a second wheel-locking position; said wheel locking means further including an actuating member that is disposed within said channel defining support member and
means attached to said clamp means for cooperating with said actuating member for moving said wheel locking means to said second wheel locking position when said clamp means is moved from its second non-clamping position to its first clamping position.

11. A device in accordance with claim 1, wherein said support member defines a channel, said wheel locking means includes an elongated actuating member that is disposed within said channel, and means attached to said clamp means for cooperating with said actuating member for moving said wheel locking means into said wheel locking position.

* * * * *

UNITED STATES PATENT OFFICE
CERTIFICATE OF CORRECTION

PATENT NO. : 3964611
DATED : June 22, 1976
INVENTOR(S) : Ralph W. Galen and John A. Vanderpoel It is certified that error appears in the above–identified patent and that said Letters Patent are hereby corrected as shown below:

Column 8, claim 10, line 7, the first occurrence of the word "support" should be omitted.

Signed and Sealed this

Seventh Day of September 1976

[SEAL]

Attest:

RUTH C. MASON
Attesting Officer

C. MARSHALL DANN
Commissioner of Patents and Trademarks